April 24, 1962     G. R. S. CHARLES     3,030,663

MOULDING PLASTIC ARTICLES

Filed March 28, 1960

INVENTOR

Geoffrey R. S. Charles

By Watson, Cole, Grindle & Watson

ATTORNEYS ized # United States Patent Office 3,030,663
Patented Apr. 24, 1962

3,030,663
MOULDING PLASTIC ARTICLES
Geoffrey Russell Stafford Charles, Marlow, England, assignor to Chelton (Poppits) Limited, Marlow, England, a British company
Filed Mar. 28, 1960, Ser. No. 18,150
14 Claims. (Cl. 18—47.5)

This invention relates to methods of molding transparent plastic articles and has for its principal object to provide a novel and attractive form of ornamentation for such articles.

It is known that certain plastic materials such as polystyrene are particularly subject to chemical attack if under stress; it has been found that articles of these materials, if subject to internal stress, develop flaws in the highly stressed region due to chemical attack by suitable reagents some of which do not otherwise attack the material. From the appearance of a stressed article after it has been so attacked, this phenomenon is known as crazing. There are many hundreds of chemical substances known that will attack polystyrene, where it is stressed, including many widely different types of reagent including for example acids such as acetic acid or sulphuric acid, inorganic salts such as sodium chloride or potassium permanganate, alkalis such as potassium hydroxide, alcohols such as methyl or ethyl alcohol, ketones such as acetone, hydrocarbons such as paraffin and many other organic and inorganic materials. It will be understood that the extent of chemical attack will depend on the employment of suitable conditions of concentration, temperature etc. Although crazing has been known, it has heretofore been regarded as wholly undesirable and, in making polystyrene mouldings, the production of articles susceptible to crazing has always been avoided. It is necessary at times to anneal such articles after moulding to prevent such stresses causing subsequent damage. The present invention makes use of this phenomenon to give certain advantageous results.

In the following description the chemical reagents suitable for producing such chemical attack in regions of high internal stress will be referred to as crazing agents.

According to one aspect of this invention a method of producing a polystyrene article includes the steps of moulding the article in a mould which is at least partly cooled sufficiently to produce internal stresses in the article and then subjecting the material to chemical attack by a crazing agent to produce a pattern of flaws in the material. This pattern of flaws can be shown to bear considerable relation to the direction of movement of the molten material in manufacture. According to another aspect of the invention, a method of producing a polystyrene article includes the steps of moulding the article, subjecting the moulded article to mechanical stress and, whilst under stress, subjecting the material to chemical attack by a crazing agent to produce a pattern of flaws in the material. Heretofore it has not been appreciated that such a pattern of flaws could be produced systematically in a regular consistent pattern in the manner to give an attractive ornamental result. By sufficiently cooling the mould or by stressing the article mechanically, adequate internal stresses can be produced to ensure an attractive pattern in the article after it has been subject to the crazing agent. If the stress is produced by cooling the article whilst it is being moulded, the cooling required can advantageously be much greater than that employed heretofore in the production of polystyrene articles as it has been the practice to avoid as far as possible any production of internal stresses so preventing any possibility of crazing.

Mechanical stressing may be effected in many different ways, for example a rod or strip may be bent or twisted whilst hollow articles may conveniently be stressed by forcing a mandrel into the hollow interior.

The invention also includes within its scope a method for molding an article from polystyrene moulding material in which the material has been differentially cooled after injection into the mould to produce internal stresses or has been subjected to applied mechanical stress and in which the material, whilst stressed, has been chemically attacked by a crazing agent to produce a pattern of flaws in the material.

The invention is particularly applicable to the production of hollow articles which are moulded by using a mould with an internal core. Such articles may be internally stressed by cooling on the outside and, after the article has been removed from the mould, the crazing agent may then be applied to the hollow interior of the article. The external surface of such hollow articles is frequently without stress owing to having been first in contact with the core mould surfaces; this is a particular advantage since the crazing carried out inside the object is, in this case, unlikely to penetrate the surface if care is taken. Alternatively such hollow articles may be stressed mechanically by forcing a mandrel into the hollow interior and, in this case also the crazing agent may be applied to the hollow interior. Furthermore the absence of flaws on the outer surface of the material is desirable owing to the possible ingress of dirt into the flaws and to the possible further disintegration of the external surface which might occur.

With hollow articles, the attractive appearance may be enhanced by applying a coloured paint or dye to the internal surface or by silvering this surface or by putting a coloured insert into the hollow interior of the article.

The invention has particular application in the production of moulded beads which are to be joined together by the use, for example, of resilient plastic inserts as described in the specification of U.S. application Serial No. 841,536 filed September 22, 1959 and entitled "Ornamental Beads and Like Bodies." Such beads may be formed with a cavity by moulding polystyrene and may then be ornamented as described above by applying a crazing agent, the bead having been internally stressed during the moulding operation by external cooling of the mould, e.g. by water cooling. Subsequently, resilient or semi-resilient plastic inserts, for example, polythene or methyl methacrylate inserts, may be put in the cavities in the beads to enable the various beads to be joined together in the manner mentioned in the aforementioned co-pending application. It is found that if such a bead is formed as a generally spherical body by injection moulding of polystyrene with injection along a diameter, then, if the outside of the mould is cooled, the flaws developed by the crazing agent will lie in diametral planes passing through the diameter of injection. With uniform cooling of the mould, these flaws will be substantially evenly spaced angularly about this diameter giving an attractive appearance to the bead.

In the following description, reference will be made to the accompanying drawings in which:

FIGURE 1 illustrates diagrammatically a mould for forming the body portion of a bead which is to have a resilient plastic insert such as is described in the aforementioned application. The bead of which the body portion is formed in this mould is shown in FIGURES 2 and 3 and has a main body portion 10 of general spherical form made of polystyrene, this body portion having formed integrally with a head 11 on the end of a neck 12. Diametrically opposite the head and neck is a socket 13 which contains a resilient insert 14, typically formed of polythene or methyl methacrylate. The insert has inturned lips 15 at its mouth so that the head of one bead may be forced through the mouth of the resilient insert with a snap action and is retained therein, the head, neck and insert being so proportioned that the beads have free play angularly when so joined together.

Figure 1:
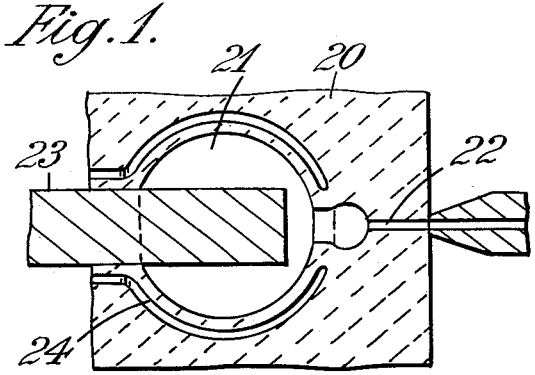
FIGURE 1 is a sectional view illustrating diagrammatically a mould for forming a bead.
Figure 2:
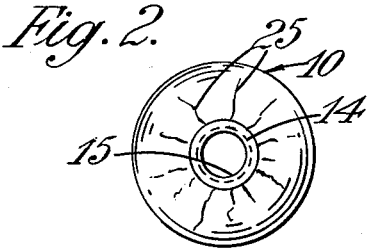
FIGURE 2 is a view in end elevation of a bead formed in the mould of FIGURE 1.
Figure 3:
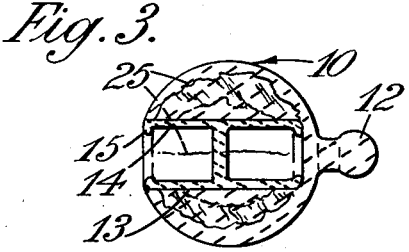
FIGURE 3 is a longitudinal cross section of the bead of FIGURE 2.

The body portion 10 of the bead is formed by injection moulding of polystyrene moulding material into a mould 20 which is illustrated diagrammatically in FIGURE 1. The mould has a main cavity 21 and the material is injected through an injection nozzle 22 leading into the portion of the cavity which will form the head on the end of the neck of the bead. A removable core 23 is provided in the mould to form the aforementioned cavity 13. For the purposes of the present invention, the mould 20 is water-cooled and cooling passages for this purpose are illustrated diagrammatically at 24. A polystyrene moulding process, in the absence of such cooling would form a clear transparent body. It is found that, provided the outside of the mould is cooled sufficiently, stresses will be set up in the polystyrene body of the bead when it is moulded. After the body portion has been so formed and has been removed from the mould, it is treated with a crazing agent which is applied to the cavity 13 of the bead so that flaws are developed in the stressed portion as previously described, the flaws extending only from the internal surface wall of the cavity, leaving a smooth exterior surface. These flaws are illustrated diagrammatically at 25 in FIGURES 2 and 3 and lie in diametral planes passing through the diameter of injection. Provided the mould is substantially uniformly cooled, these flaws will be substantially evenly spaced angularly about this diameter giving an attractive appearance to the bead. The appearance of the flaws may be enhanced by applying a paint or dye to the inside of the cavity 13 or by silvering the surface of the cavity or by using a coloured insert 14.

Although in the accompanying drawings there has been described more particularly the application of the invention to one particular form of bead, it will be appreciated that the invention may equally well be applied to beads formed with two heads on the end of necks arranged on opposite sides of the diameter and to beads with two resilient inserts forming sockets. Furthermore, more generally the invention may be applied to other bodies moulded from polystyrene. In this particular example the internal stressing of the body is affected by differential cooling but, for hollow bodies, this stressing may equally well be effected by forcing a mandrel or the like into the hollow interior of the body. Other shaped bodies may be stressed in various manners which will be determined in general by the shape of the body to be treated; for example an elongated body such as a rod or bar may conveniently be stressed by bending or twisting.

I claim:

1. A method of producing a polystyrene article comprising the steps of moulding the article in a mould part of which is cooled sufficiently to produce internal stresses in the article, and then subjecting the material to chemical attack by a crazing agent to produce a pattern of flaws in the material.

2. A method of producing a polystyrene article comprising the steps of moulding the article, subjecting the article to mechanical stress and, whilst under stress, subjecting the material to chemical attack by a crazing agent to produce a pattern of flaws in the material.

3. A method of producing a polystyrene article as claimed in claim 2 wherein the article is of elongated form and is subjected to stress by bending.

4. A method of producing a polystyrene article as claimed in claim 2 wherein the article is of hollow form and is subjected to stress by forcing a mandrel into the hollow interior.

5. A method of producing a polystyrene article as claimed in claim 1 wherein the article is of hollow form and is internally stressed by cooling on the outside.

6. A method of producing a polystyrene article as claimed in claim 5 wherein the crazing agent is applied to the hollow interior of the article.

7. A method of producing a polystyrene article as claimed in claim 5 wherein a coloring agent is applied to the internal surface of the article.

8. A method of producing a polystyrene article as claimed in claim 5 wherein the internal surface of the article is silvered.

9. A method of producing a polystyrene article as claimed in claim 5 wherein a coloured insert is put into the hollow interior of the article.

10. A method of producing a polystyrene article as claimed in claim 2 wherein the article is of elongated form and is subjected to stress by twisting.

11. A method of producing a bead comprising a body portion with a hollow interior, which method comprises the steps of injecting polystyrene molding material into a mold having a core to form the body portion with the hollow interior, cooling the mold by circulating a cooling fluid around the mold portion defining the external surface of said body after injection of the material into the mold to produce internal stress in the material, and then subjecting the hollow interior of the body while the material is stressed to chemical attack by a crazing agent to produce a pattern of flaws in the material.

12. A method as claimed in claim 11 wherein the internal surface of the molded polystyrene is subsequently silvered.

13. A method as claimed in claim 11 wherein a coloring agent is subsequently applied to the interior surface of the molded polystyrene.

14. A method of producing an ornamental article in the form of a solid body with a hollow interior, comprising the steps of molding the body of polystyrene molding material in a closed mold having a core member to form the hollow interior, differentially cooling the mold after injection of the material in regions uniformly distributed around the external surface of the article to produce a symmetrical pattern of internal stresses in the material, and subjecting the hollow interior of the material, while so stressed, to chemical attack by a crazing agent to produce a pattern of flaws in said body.

References Cited in the file of this patent

UNITED STATES PATENTS

| | | |
|---|---|---|
| 2,360,650 | Crane | Oct. 17, 1944 |
| 2,373,093 | Baker | Apr. 10, 1945 |
| 2,714,269 | Charles | Aug. 2, 1955 |
| 2,889,611 | Bedell | June 9, 1959 |
| 2,948,927 | Rasmussen | Aug. 16, 1960 |
| 2,955,324 | Morgan | Oct. 11, 1960 |
| 3,012,282 | Donald | Dec. 12, 1961 |

FOREIGN PATENTS

| | | |
|---|---|---|
| 450,444 | Canada | Aug. 10, 1948 |